US006553279B2

(12) United States Patent　　(10) Patent No.:　　US 6,553,279 B2
　　Brown　　　　　　　　　　　　(45) Date of Patent:　　Apr. 22, 2003

(54) METHOD FOR CONSOLIDATING MANUFACTURING OF COMPUTING DEVICES

(75) Inventor: Mark D. Brown, Austin, TX (US)

(73) Assignee: Dell USA, L.P., Round Rock, TX (US)

( * ) Notice: Subject to any disclaimer, the term of this patent is extended or adjusted under 35 U.S.C. 154(b) by 0 days.

(21) Appl. No.: 09/997,146

(22) Filed: Nov. 29, 2001

(65) Prior Publication Data

US 2002/0116087 A1 Aug. 22, 2002

Related U.S. Application Data

(62) Division of application No. 09/484,712, filed on Jan. 18, 2000.

(51) Int. Cl.[7] ................................................ G06F 7/00
(52) U.S. Cl. ........................ 700/230; 700/216; 700/95; 700/112
(58) Field of Search ........................... 700/95, 112, 113, 700/116, 213, 216, 228, 230

(56) References Cited

U.S. PATENT DOCUMENTS

| 4,473,935 A | 10/1984 | Tatsuura et al. |
| 4,815,190 A | 3/1989 | Haba Jr. et al. |
| 4,821,197 A | 4/1989 | Kenik et al. |
| 4,823,233 A | 4/1989 | Brown et al. |
| 4,894,908 A | 1/1990 | Haba, Jr. et al. |
| 5,144,532 A | 9/1992 | Wessely et al. |
| 5,513,427 A | 5/1996 | Yokoyama et al. |
| 5,822,216 A | 10/1998 | Satchell, Jr. et al. |
| 5,894,571 A | 4/1999 | O'Connor |
| 6,170,630 B1 * | 1/2001 | Goss et al. ............... 193/35 A |
| 6,202,824 B1 * | 3/2001 | Goss et al. .............. 198/346.2 |
| 6,308,496 B1 * | 10/2001 | Lee et al. ..................... 53/154 |
| 6,314,337 B1 * | 11/2001 | Marcum ..................... 700/216 |

FOREIGN PATENT DOCUMENTS

| EP | 0 308 248 A2 | 3/1989 |
| EP | 0 606 515 A2 | 7/1994 |

* cited by examiner

*Primary Examiner*—Khoi H. Tran
(74) *Attorney, Agent, or Firm*—Michael J. Balconi-Lamica; Haynes and Boone, LLP

(57) ABSTRACT

A system and method of manufacturing of computing devices. The system and method advantageously provide a work cell and process for physically consolidating the transformation process of a computer system (motherboard prep, chassis prep, assembly, EMR, burn, test and boxing) during manufacturing of the same in one work area. The new consolidating manufacturing assembly work cell provides a streamlined process, automation, furniture, fixtures and intelligent controls which physically consolidate the steps of the transformation process. The work cell includes a new combination of equipment for: (1) Material Handling, (2) performing the assembly steps, (3) detecting and repairing electrical and mechanical problems, and (4) performing burn and test. Further, the integration of the transformation process into one consolidated work cell for the manufacture of computer systems enables a new and more versatile manufacturing process. Accordingly, these transformation process steps can be carried out by the same operator/team without having to move a computer system being manufactured to various different parts of the factory during its transformation.

13 Claims, 9 Drawing Sheets

METHOD FOR CONSOLIDATING MANUFACTURING OF COMPUTING DEVICES

CROSS-REFERENCE TO CO-PENDING APPLICATION

This application is a Divisional of U.S. Ser. No. 09/484,712, filed Jan. 18, 2000.

This application relates to co-pending U.S. patent application Ser. No. 09/053,524, filed on Mar. 31, 1998, entitled "Manufacturing System and Method for Assembly of Computer Systems in a Build-to-Order Environment," naming Lois Goss as inventor. The co-pending application is incorporated herein by reference in its entirety, and is assigned to the assignee of the present invention.

BACKGROUND

The disclosures herein relate generally to computer systems, and more particularly, to a process and apparatus for physically consolidating and streamlining the manufacturing of computer systems in a build-to-order environment.

Traditionally, manufacturing systems have been designed and constructed based upon a build-to-stock model where large quantities of identical products are assembled to meet forecasted demand and warehoused until that demand occurs. Such manufacturing systems provide economies of scale based upon the large quantities of identical units and can be optimized by increasing the speed with which each manufacturing step is completed. Because build-to-stock manufacturing systems rely on known product configurations, each step in the manufacturing process is known in advance, and so the manufacturing system utilizes progressive build techniques to optimize each stage in the serial assembly process. For products (e.g. a computer system) that include sensitive components, progressive build manufacturing systems can be carefully planned in advance to protect those sensitive components. Once the manufacturing system becomes operational, it will build the same product repeatedly, using the optimized steps.

However, when the process is adapted to build a different product, or a different version of the same product, the manufacturing system must be modified and re-optimized to ensure that the system still protects sensitive components. Moreover, since the progressive build process is serial, each stage depends on timely completion of the previous stage, and thus the entire process is susceptible to problems, inefficiencies, and failures in any of the stages of the system. Additionally, progressive-build manufacturing systems operating in a build-to-stock environment are relatively inflexible, limiting the ability of the manufacturing system to fill small orders economically and to control inventory.

One method used to increase performance in progressive-build manufacturing processes is to include a process step in which identical kits are prepared that hold the components needed to assemble a particular product or to complete a particular manufacturing step. In this way some of the time normally required to select parts for a particular product or manufacturing step can be reduced, and some manufacturing steps can more easily be performed in one location or by one operator or piece of manufacturing equipment (e.g. an industrial robot). For example, U.S. Pat. No. 4,815,190 discloses the use of automated and manual kitting stages for producing identical kits for automobile sub-assemblies. One advantage to using identical kits is that it is relatively easy to know if all of the parts needed to assemble a particular product are present in the kit; a missing part stands out because each kit should always have the same set of components.

As an alternative to progressive-build manufacturing systems which are often faced with the problem of large dwell times, i.e. time periods where a product being assembled must wait before moving to a subsequent assembly stage, some manufacturing systems have been shifted to continuous flow manufacturing (CFM) methods. In general. CFM methods employ a demand-driven pull system for inventory control and movement of components into the assembly process. This can include the use of kanban techniques for inventory control and movement. CFM also supports mixed-model manufacturing continuous flow production lines. CFM systems offer continuous flow of value added activities, eliminating wasted motion and dwell times. Other terms often used for CFM include Just-In-Time (JIT) manufacturing, Flexible and Agile Manufacturing, Synchronous Manufacturing and Demand Based Conversion.

Personal computers, servers, workstations, portables, embedded systems and other computer systems are typically assembled in manufacturing systems designed for build-to-stock environments. A typical personal computer system includes a processor, associated memory and control logic and a number of peripheral devices that provide input and output (I/O) for the system. Such peripheral devices include, for example, compact disk read-only memory (CD-ROM) drives, hard disk drives, floppy disk drives, and other mass storage devices such as tape drives, compact disk recordable (CD-R) drives, digital video/versatile disk (DVD) drives, or the like.

Manufacturing computer systems becomes inefficient when the number of identical units is decreased and process steps are changed as orders change, both of which are characteristics of a build-to-order environment where computer systems (or products generally) are manufactured or assembled only after an order for that particular computer system has been placed. As a result, the conventional manufacturing systems do not adapt well to the build-to-order environment and can limit the ability to fill small orders, require extra inventory, generate more work-in-process, and be globally constrained by the slowest process step. This process also requires line changeovers and new tooling when change is required. One attempt to adapt and to improve the efficiency of conventional manufacturing systems has been to reduce the number of components prepared in advance of orders. By limiting such in-process inventory, the line can change configurations more easily as orders change. However, this scheme is still limited in its efficiency for smaller orders in the build-to-order environment.

Because computer systems manufacturers have recognized that a build-to-order environment is advantageous and often can better react to the speed with which product designs and customer expectations change, there is a need to provide manufacturing systems and methods that more efficiently integrate with the build-to-order model while ensuring that high quality, defect free products are produced.

Current manufacturing of build-to-order computers is limited by the particular manufacturing line used. For instance, to double the productivity of a current factory manufacturing line process for a given floor space (in terms of units/hour/square foot (Units/Hr./Sq.Ft.)), additional manufacturing plants will be necessary to meet an increased demand. The cost of building new manufacturing plants can be substantial, for example, at an average cost of approximately $100M or more per plant. Product quality and manufacturing flexibility suffer, wherein generally only one product line can be built on any given assembly line at a time. Merely doubling the existing manufacturing line process further suffers from an inability to adjust to changes in product demand and an inability to improve floor space utilization. In addition, profitability and customer experience suffer degradation with a mere doubling of an existing manufacturing line process.

Referring briefly to FIG. 1. a flow diagram view of a computer build-to-order manufacturing process is illustrated. In general, the manufacturing process 10 includes receipt of a customer order 12, kitting of parts 14, motherboard preparation 16, assembly and quick test 18, burn (i.e., software download and extended test) 20. Federal Communication Commission testing (FCC test and label application) 22, high potential (HI POT) testing 24, wipe down (inspection and cleaning of computer chassis) 26, document kitting 28, boxing 30, transport to the distribution center 32, shipping 34, and finally, customer receipt 36.

FIG. 2 illustrates a plan view of various portions of the distributed manufacturing line in the manufacture of build-to-order computer systems. The distributed manufacturing line is generally indicated by the reference numeral 10a. Separate stations or areas are provided for each of the portions of the distributed manufacturing line, for example, as follows. Motherboard preparation is generally indicated by reference numeral 16a. Assembly/quick test is generally indicated by reference numeral 18a. Electrical mechanical repair (EMR) is generally indicated by reference numeral 19. Burn or extended test is generally indicated by reference numeral 20a. HI POT is generally indicated by reference numeral 24a. FCC is generally indicated by reference numeral 22a. Wipedown is generally indicated by reference numeral 26a. Lastly, boxing is generally indicated by reference numeral 30a.

FIG. 3 is a plan view layout of the various portions of the distributed manufacturing line of FIG. 2. The layout is generally indicated by reference numeral 50. The physical layout of equipment for performing the various portions of the distributed manufacturing process are illustrated, from left to right. The layout includes kitting 14a, mother board preparation 16a, assembly 18a, EMR 19, burn 20a, a combination of FCC/HI POT/wipedown (22a, 24a, 26a), boxing and documentation 30a, and direct ship 36 (or distribution center 32 and ship 34). The distributed manufacturing line of FIG. 3 is characterized in that it requires on the order of 22.120 sq. ft. for a potential production yield or rate on the order of 240 units/hour, with a potential plant capacity of on the order of approximately 1200 units/hour.

Furthermore, in the manufacturing of build-to-order computing devices, direct ship is an important strategic initiative. Direct ship is a method for reducing cost per box and speeds product delivery. Direct ship involves adding special material handling equipment and loading dock doors at the end of a manufacturing process line. A drawback to direct ship, however, is that direct ship consumes valuable manufacturing floor space. In order to implement direct ship into existing build-to-order manufacturing line buildings, and maintain and/or increase production, a new, higher performing manufacturing line design is needed.

In addition to direct ship, competitive pressures are causing the average computer price to drop dramatically. In order to maintain margins, it is critical that new ways to lower manufacturing costs be developed. Accordingly, an improved method of manufacturing of computing devices is needed.

SUMMARY

One embodiment accordingly provides a consolidated manufacturing cell method for the manufacture of custom configured computer systems by providing a work surface including at least one section suitable for use during an assembly of a computer system from a kit of parts, providing an elevator including a cargo surface suitable for receiving an assembled computer system and being disposed with respect to the work surface for vertical movement between at least a first vertical level and a second vertical level, providing at least one burn slot vertically disposed with respect to the work surface, the at least one burn slot further for receiving an assembled computer system during a prescribed burn processing thereof, and controlling an operation of the elevator to deliver an assembled computer system from the work surface to an available burn slot of the at least one burn slot.

A principal advantage of this embodiment is that the new consolidating manufacturing assembly work cell provides automation, furniture, fixtures and intelligent controls which physically consolidate the steps of the transformation process (i.e., chassis prep, mother board prep, assembly, EMR, burn, test and boxing).

DETAILED DESCRIPTION

The present disclosure can be described with the examples given below. It is understood, however, that the examples below are not necessarily limitations to the present disclosure, but are used to describe typical embodiments of operation.

Figure 1:
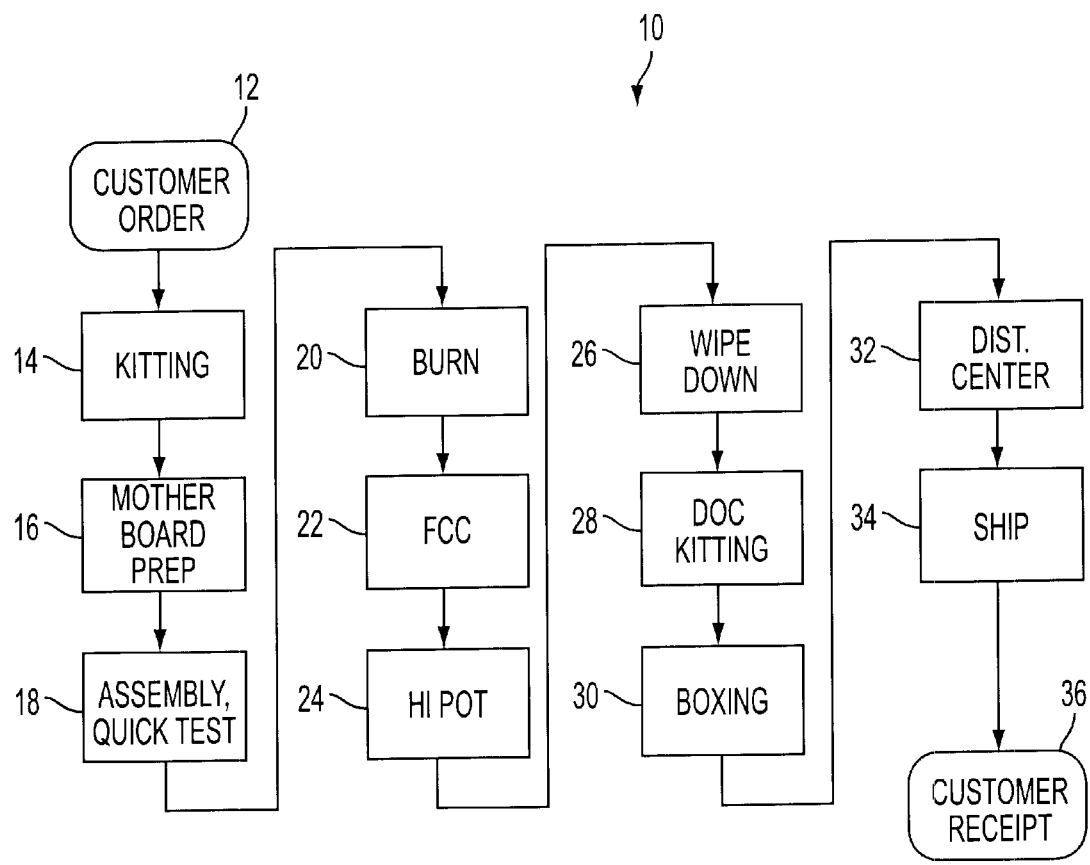
FIG. 1 illustrates a flow diagram view of a computer system build-to-order manufacturing process.
Figure 2:
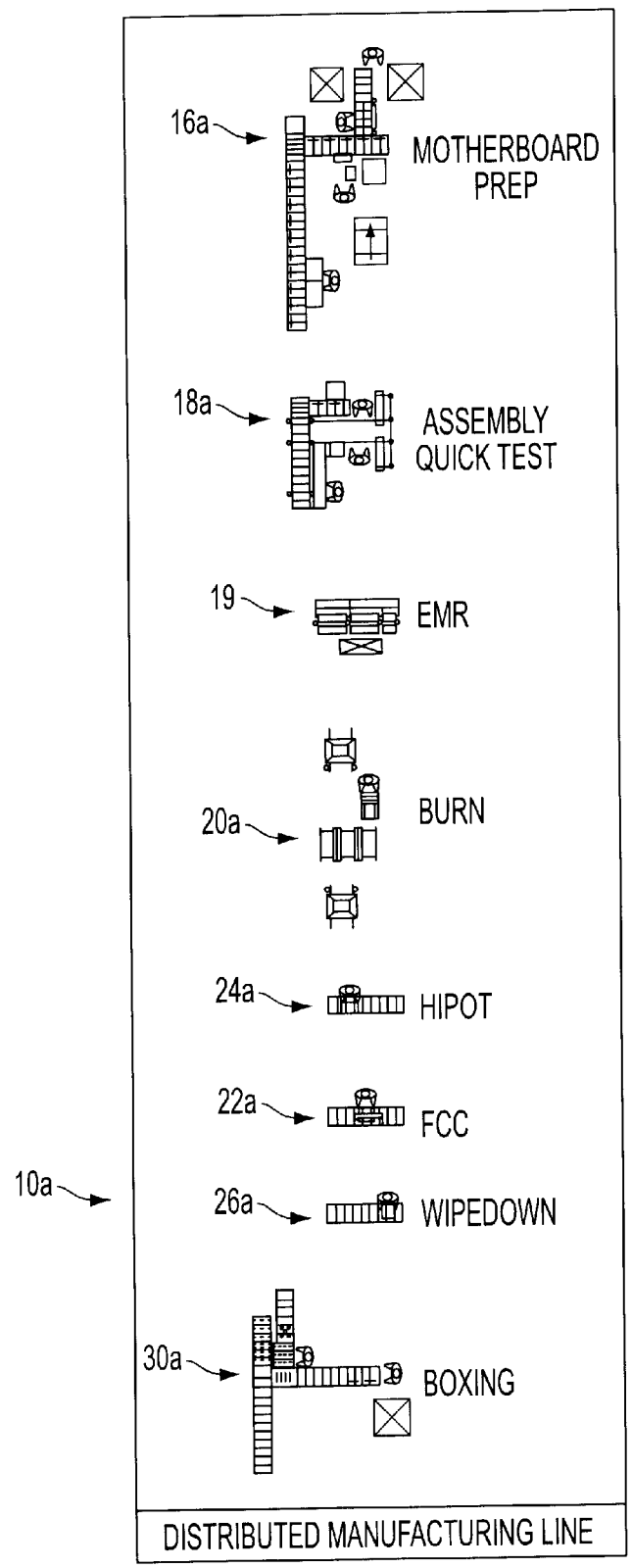
FIG. 2 is a plan view of various portions of a distributed manufacturing line in the manufacture of build-to-order computer.
Figure 3:
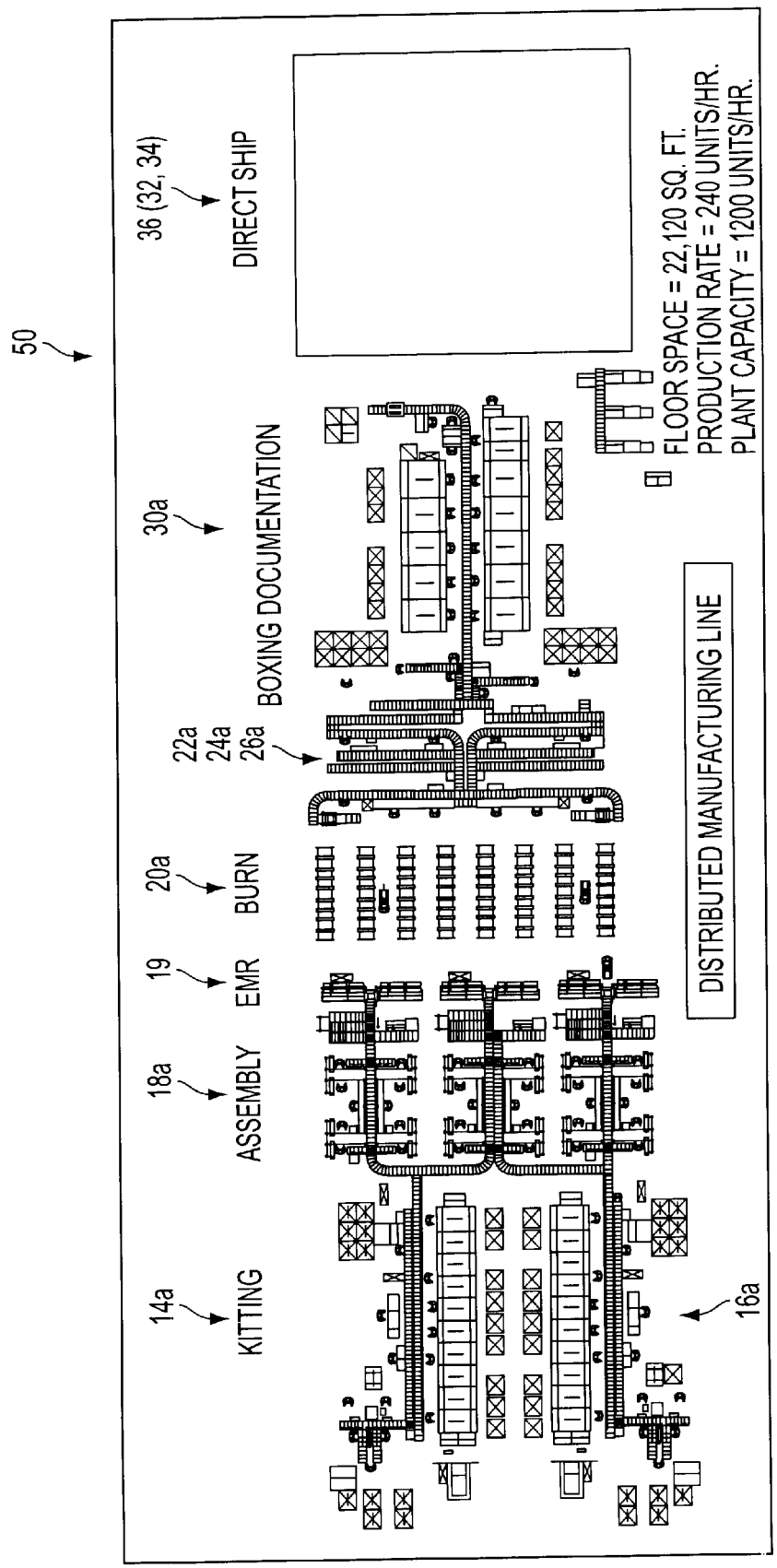
FIG. 3 is a plan view layout of the various portions of the distributed manufacturing line of FIG. 2.
Figure 4:
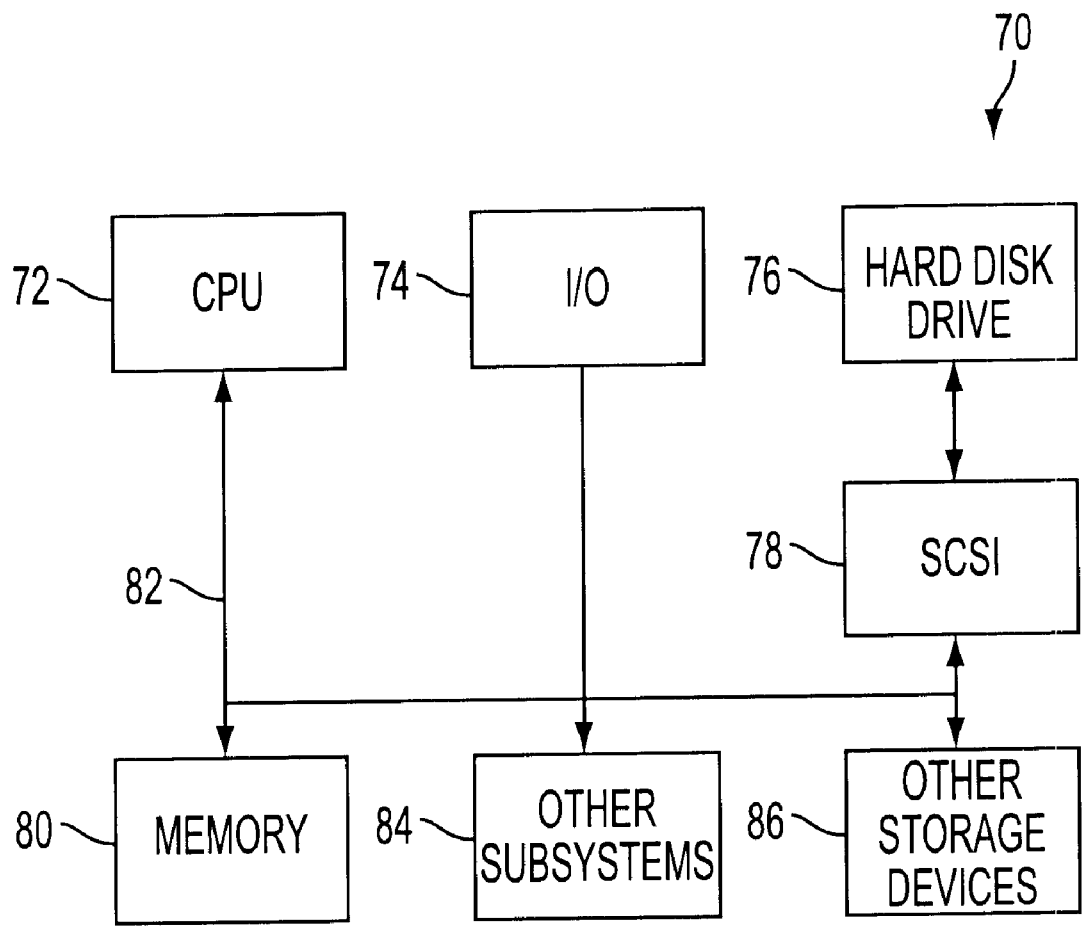
FIG. 4 illustrates an exemplary computer system that the present disclosure can build-to-order.

First, in order to provide a foundation to better describe the preferred embodiment of the invention, a typical computer system will be described. Referring briefly to FIG. 4, a system block diagram of a computer system 10 is shown having features thereof configured in accordance to a customer configured computer system order. The computer system 70 includes a central processing unit (CPU) 72, input/output (I/O) devices, such as a display, a keyboard, a mouse, and associated controllers and collectively designated by a reference numeral 74, at least one hard disk drive 76, and other storage devices, which may include a floppy disk drive or a CD-ROM drive, and the like, are collectively designated by a reference numeral 86. Various other subsystems, such as a network interface card (NIC), are collectively designated by a reference numeral 84. Computer system 70 further includes memory 80, such as random access memory (RAM) and read only memory (ROM). The various components are interconnected via one or more buses, shown collectively as a bus 82. Computer system 70 further includes a SCSI (small computer system interface) controller 78 or other suitable interface (e.g., IDE, etc.) coupled between the CPU 72 and the at least one hard disk drive 76. For instance, the SCSI controller 78 and at least one hard disk drive 76 may form a redundant array of inexpensive disks (RAID). The computer system described in FIG. 4 is typical of the type of computer hardware that may be ordered by a customer.

Figure 5:
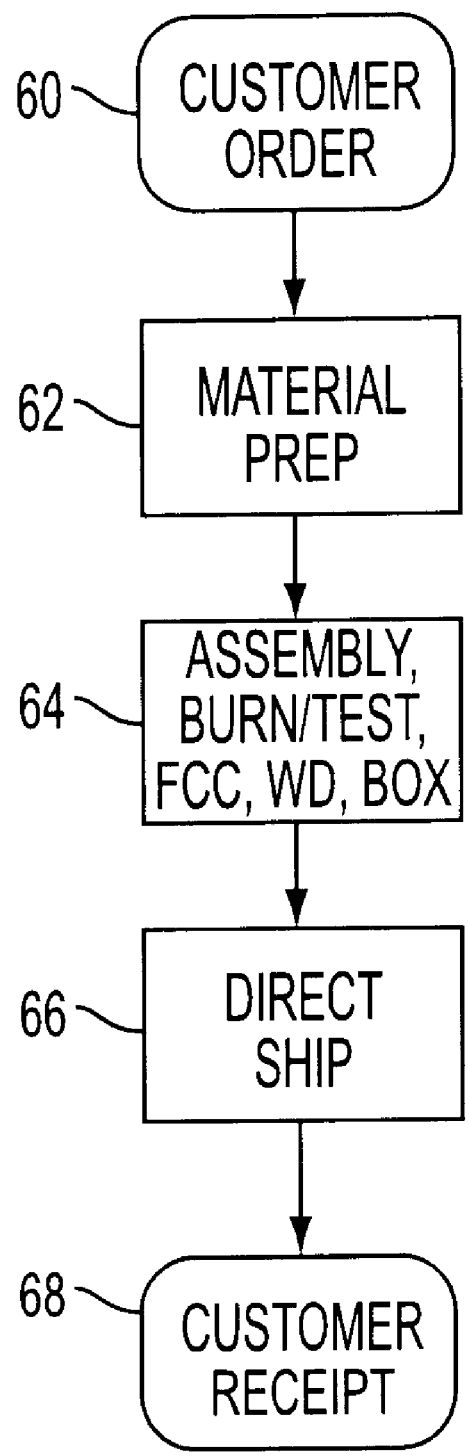
FIG. 5 illustrates a flow diagram view of a computer system build-to-order manufacturing process including use of a consolidated manufacturing cell according to the present disclosure.

FIG. 5 illustrates a flow diagram view of a computer system build-to-order manufacturing process including use of a consolidated manufacturing cell according to the present disclosure. According to an embodiment of the invention, a customer order is taken in step 60. The material preparation happens in step 62. The assembly, burn and test, including FCC testing, the wipedown and boxing of the BTO computer system all happens in step 64. The computer system then gets direct shipped in step 66. The customer receipt of the computer system is the last step 68.

Figure 6:
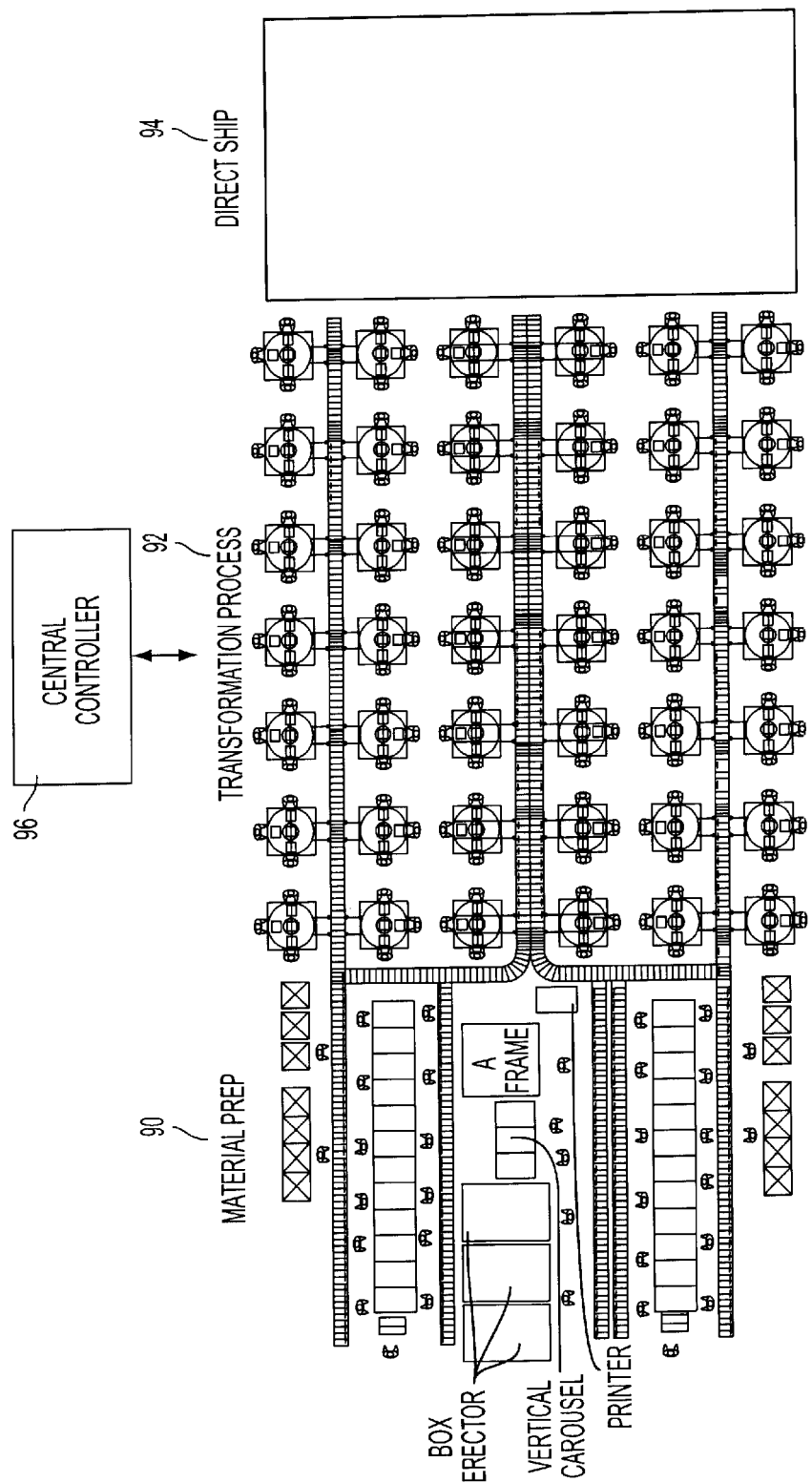
FIG. 6 is a plan view layout of the manufacturing process according to the present disclosure.

FIG. 6 is a plan view layout of the manufacturing process according to the present disclosure. The layout is broken up into a Material Preparation area 90, a Transformation Process area 92, and a Direct Ship area 94. The process is also controlled by a central controller 96.

Figure 7:
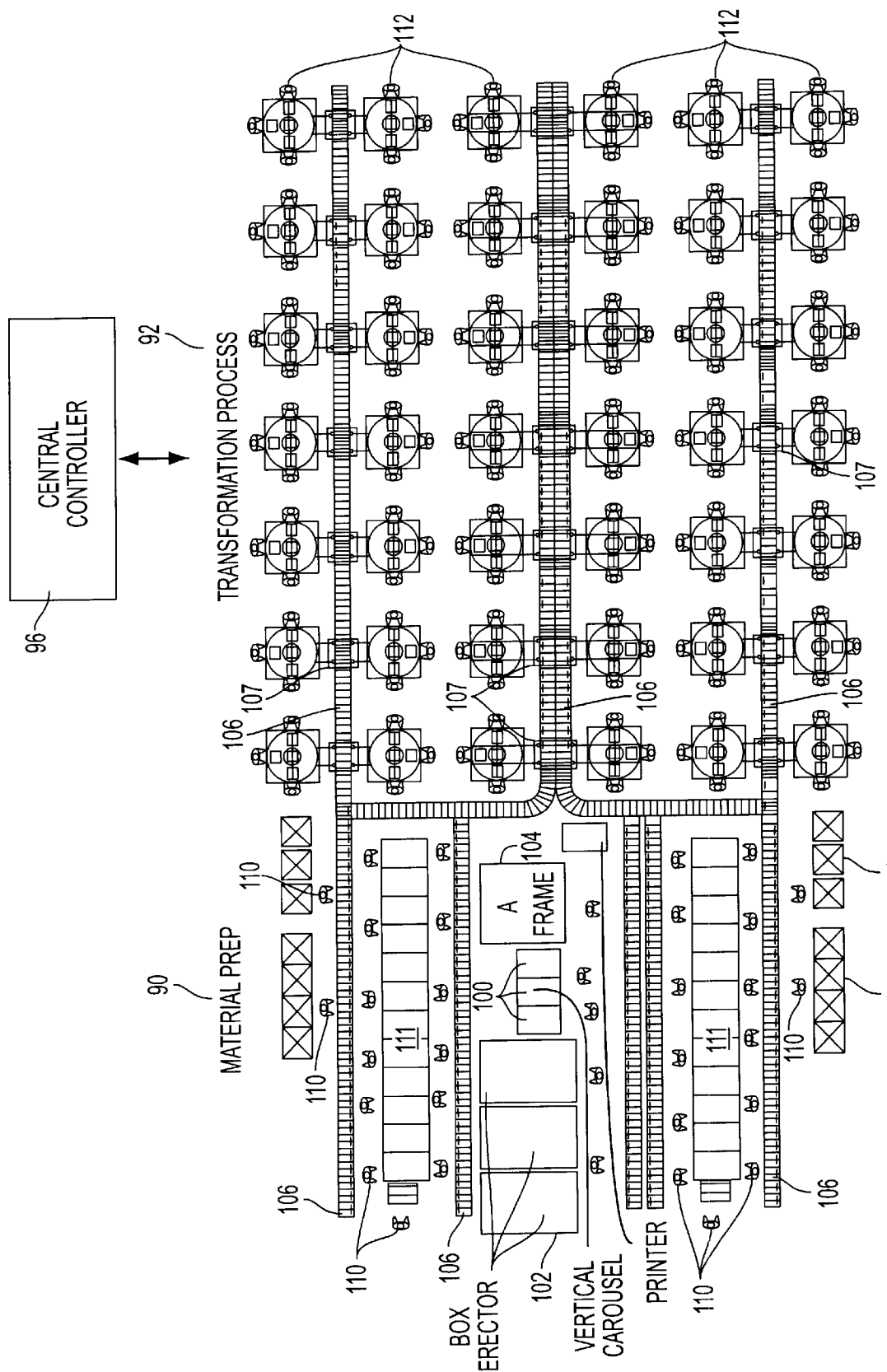
FIG. 7 is a plan view of a portion of the layout of FIG. 6. enlarged to show greater detail.

FIG. 7 is a plan view of a portion of the layout of FIG. 6, enlarged to show greater detail of the Material Preparation area 90 and the Transformation Process area 92. Operators 110 are surrounded by vertical carousels 100, box erectors 102, A frame 104, conveyor belts 106, overhead conveyors 107, chassis units 108, hold shelving 109 and work tables 111. In addition, consolidated assembly cells 112 are depicted in the transformation area along with the conveyors 106 and the overhead conveyors 107. Each element will be explained in further detail later in the text.

In one embodiment, the central controller 96 includes a build-to-order factory computer. The build-to-order factory computer may include a control unit capable of receiving a product order describing a product to be assembled, the control unit including a list of product components for the product to be assembled. A kitting unit of the Material Preparation area 90 is coupled to the control unit and configured to received the list of product components, wherein the kitting unit includes a plurality of kit trays (or totes), a plurality of stored product components, and a product component list display device. The product component list display device is configured to display the list of product components for enabling preparation of a kit tray with product components having been pulled from the stored product components in the Material Preparation area 90. The kitting unit can be coupled to the consolidated manufacturing cell 112 in the Transformation Process area 92 via conveyor 107, further assembly of the product using the product components from the prepared kit tray at the consolidated manufacturing cell 112.

Figure 8:
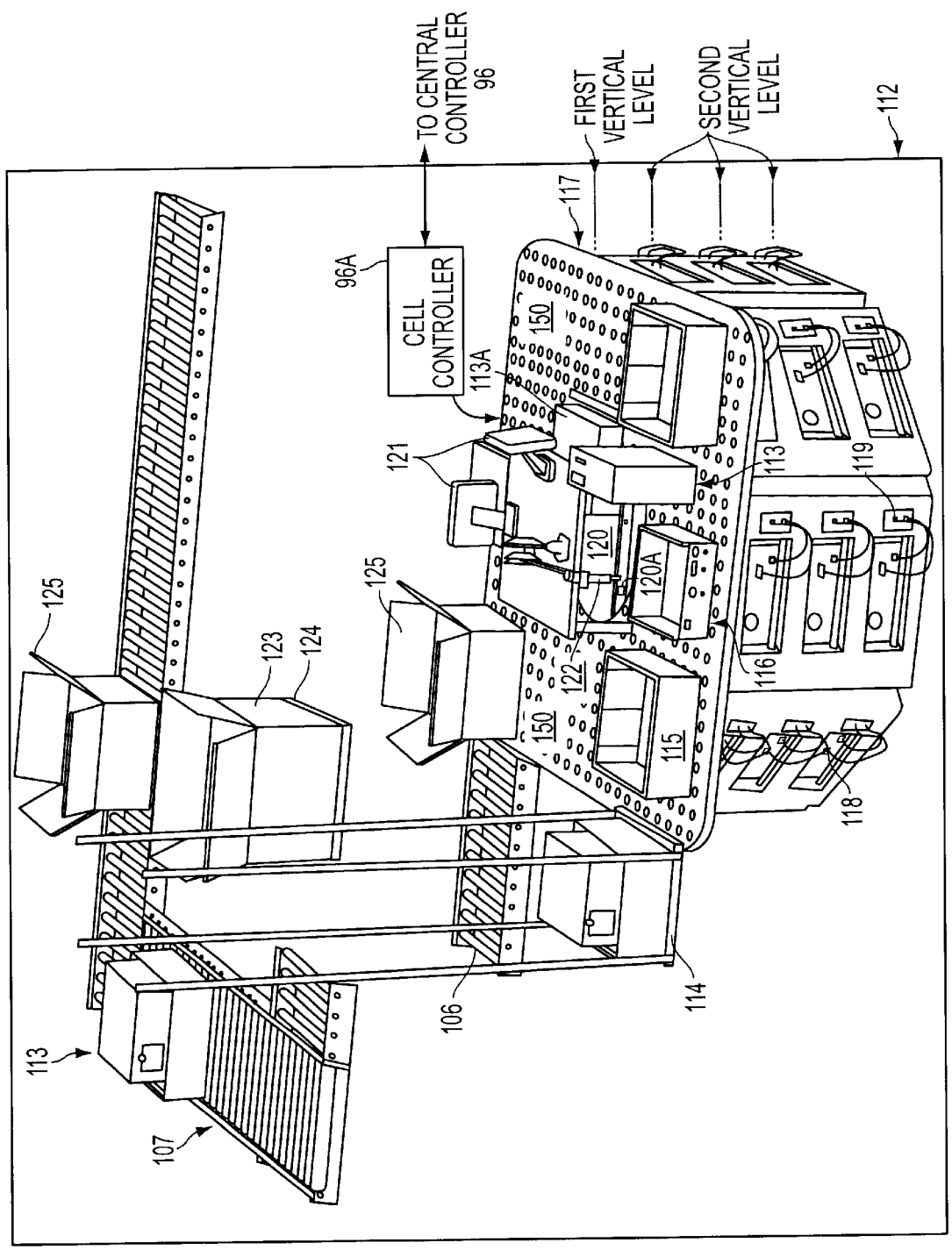
FIG. 8 is a plan view of a consolidated manufacturing cell according to an embodiment of the present disclosure.

FIG. 8 is a schematic view of an exemplary consolidated manufacturing cell 112 according to one embodiment. The overhead conveyor 107 delivers a kit of parts 113 to the consolidated cell 112 via conveyor elevator or overhead lift system 114. The kit of parts 113 is put together according to a customer order for a custom computer system, the parts having been gathered into a container (or tote) 115 during a kitting operation prior to being delivered to the consolidated cell 112 via overhead conveyor 107 and conveyor elevator 114. In other words, the overhead delivery conveyor 107 is configured to deliver the kit of parts for use in the manufacture of a custom configured computer system. In addition, conveyor elevator 114 is configured to deliver the kit of parts 113 from the overhead conveyor 107 to a first work surface of the consolidated cell 112.

The kit of parts 113, including a computer system chassis 116 in tote 115, is delivered to an assembly area proximate the conveyor elevator 114. The assembly area is suitable for use in assembling the computer system from the kit of parts received in tote 115. In particular, the first work surface includes a surface of the cell work table and burn station 117 of consolidated cell 112.

Referring still to FIG. 8, the cell work table and burn station 117 include pop-up balls 150 placed on the cell work table to facilitate movement of the computer system about the surface. The pop-up balls 150 can be easily activated, for example, by a foot lever (not shown).

According to one embodiment, the work table and burn station 117 of manufacturing cell 112 includes a plurality of burn slots 118. The plurality of burn slots includes burn slots disposed vertically from one another, and burn slots disposed radially about an axis.

For example, in one embodiment, the work table and burn station 117 includes twenty-four burn slots 118 and corresponding AC power and communication access connections or ports 119. The burn slots 118 include eight burn slot columns radially disposed about a vertical axis, further including three vertically disposed burn slots per column. The vertical axis includes an axis of a dispatch elevator 120, as will be further discussed below. AC power and communication access ports 119 are accessible from an exterior of work table and burn station 117 of the consolidated manufacturing cell 112, as shown in FIG. 8. AC power and communication access connections 119 allow for downloading software to an assembled computer system received in a respective burn slot during a burn processing of the assembled computer system.

The work table and burn station 117 further includes a tote lift 120 centrally disposed within the work surface. The tote lift 120 can rotate up to 360°. More particularly, central tote lift 120 comprises a dispatch elevator. The dispatch elevator dispatches or delivers an assembled computer system to an available burn slot for burn processing of the assembled computer. That is, the dispatch elevator is configured to move an assembled computer system 113A on a tray into one of the twenty four burn slots 118. A controller 96A (FIGS. 8 and 9) controls an operation of the dispatch elevator to deliver the assembled computer system from the work surface to an available burn slot, further as discussed below.

In one embodiment, the dispatch elevator 120 is configured to receive an assembled computer system 113A in a first orientation and to dispatch the computer system in a second orientation. More particularly, the dispatch elevator 120 includes a cargo surface suitable for receiving an assembled computer system 113A. The cargo surface disposed with respect to the work surface 150 and is configured to move vertically between at least a first vertical level and a second vertical level. In one embodiment, the first vertical level corresponds to a vertical level of the work surface 150 and the second vertical level corresponds to a vertical level of an available burn slot 118. In another embodiment, the cargo surface of the elevator is also disposed for rotational motion between a first rotational position and a second rotational position, for dispatching the assembled computer system to one of the plurality of burn slots radially disposed about the axis. FIG. 8 illustrates the burn slots 118 radially disposed about an axis of dispatch elevator 120.

As mentioned, controller 96A controls the operation of the dispatch elevator to deliver the assembled computer system 113A from the work surface to an available burn slot. In one embodiment, the controller 96A controls the operation of the elevator 120 for delivery of the assembled computer system within the available burn slot in a prescribed orientation, the prescribed orientation including power and communication ports of the assembled computer system accessible from an exterior of the work table and burn station 117 of the consolidated manufacturing cell 112, as shown in FIG. 8. The controller 96A further controls the operation of the elevator for retrieval of a prescribed computer system from a corresponding burn slot in response to an indication that burn processing for the prescribed computer system is completed. The controller 96A further controls the operation of the delivery elevator 120 for delivering the prescribed computer system to the work surface during the retrieval.

In addition, the work table and burn station 117 includes a detector 120A configured to detect a presence of an assembled computer system 113A placed upon the cargo surface of the elevator 120. Controller 96A further controls the operation of the elevator 120 in response to a detection of the assembled computer system by the detector 120A.

The work table and burn station 117 also includes flat screen displays 121 for monitoring and controlling the burn slots and other functions of the consolidated cell 112. For example, the flat screen displays may include interactive flat panel displays configured to enable interactive communications between an operator and the controller 96A of manufacturing cell 112. The work table also includes a screwdriver 122 for assisting an operator at the work table 117. An overhead box chute 123 is configured to deliver shipping boxes 125 to an operator, while spring stops 124 on the overhead box chute 123 keep the boxes 125 in place until the operator is ready to use them. Each custom configured computer system is packaged in a prescribed shipping box corresponding to the particular custom configured computer system assembled and tested at the consolidated manufacturing cell 112. In addition, a vacu-hoist (not shown) can be provided to assist in lifting assembled and tested computers into the respective shipping boxes when the operator is ready to package them. The conveyor 106 takes finished computer systems to the direct shipping area, for example, area 94 of FIG. 6.

In another embodiment, the controller 96A includes a means for monitoring an available capacity of the consolidated manufacturing cell 112 and for signaling a delivery of a kit of parts 113 to be received at the work surface in response to a prescribed measure of available capacity. For example, the prescribed measure of available capacity can comprise a function of available burn slots and burn time. In addition, the prescribed measure of available capacity can comprise a function of the presence of a kit of parts being assembled on the work surface of work table and burn station 117. Still, further the prescribed measure of available capacity can comprise a function of at least one of the following selected from the group consisting of: slots; an availability of the burn slots; and a presence of a kit of parts being assembled on the work surface.

In still another embodiment, the controller 96A provides a means for indicating a completion of burn processing of a prescribed assembled computer system, wherein responsive to an indication of completing burn processing, the controller 96A signals for a preparation of a shipping box for the prescribed assembled computer system.

According to yet another embodiment, the central controller 96 of FIG. 6 corresponds to a main build-to-order factory computer that interfaces with controller 96A of the consolidated manufacturing cell 112 of FIG. 8. In another embodiment, each custom configured computer system is identified by a system descriptor record (SDR) and corresponding to identification of a custom configured computer system manufactured according to a customer order. The main build-to-order factory computer 96 and the controller 96A of the consolidated manufacturing cell 112 are configured to track the manufacturing of computer systems using respective system descriptor records.

Now, for ease of reading the description, the rest of the text break up the embodiments into specific phases of the improved manufacturing process and refer back to FIGS. 7–8 to describe the elements in each figure.

Kitting Process

All incoming material is delivered through dock doors proximate a kitting area (material preparation area 90). The material is loaded directly into material prep equipment. Three types of material prep equipment are utilized in the preferred embodiment, including flow racks (not shown), vertical carousels 100, and automated dispensing systems (not shown) which are known in the art. Flow racks can store any type of material. However, flow racks are best suited for high volume, odd shaped, sensitive parts. Vertical carousels 100 save floor space and are best suited for medium volume, odd shaped, sensitive parts. Automated dispensing systems reduce labor requirements and are best suited for high volume parts, that are consistent in both shape and weight, and are not sensitive to automated material handling.

Operators pick prescribed parts from the flow racks/carousel and place the parts in a tote according to the requirements of a given computer order. Parts are scanned prior to being placed in the tote, to prevent "Missing and Wrong" manufacturing process errors. The tote is positioned proximate an operators on a manual slide to facilitate part picking ergonomics. Operators work on one tote at a time to reduce the chances for "Missing and Wrong" errors.

In the case of the automated dispenser, a tote travels on a small conveyor, and the automated dispenser machine delivers the appropriate materials into the tote. At the end of the kitting process, the tote is delivered to the consolidated manufacturing assembly cells via an overhead conveyor system 107. A suitable material management software program is responsible for tracking inventory levels, and notifying the vendor, when supplies are required for replenishment of parts and materials.

Assembly Cell Process

Figure 9:
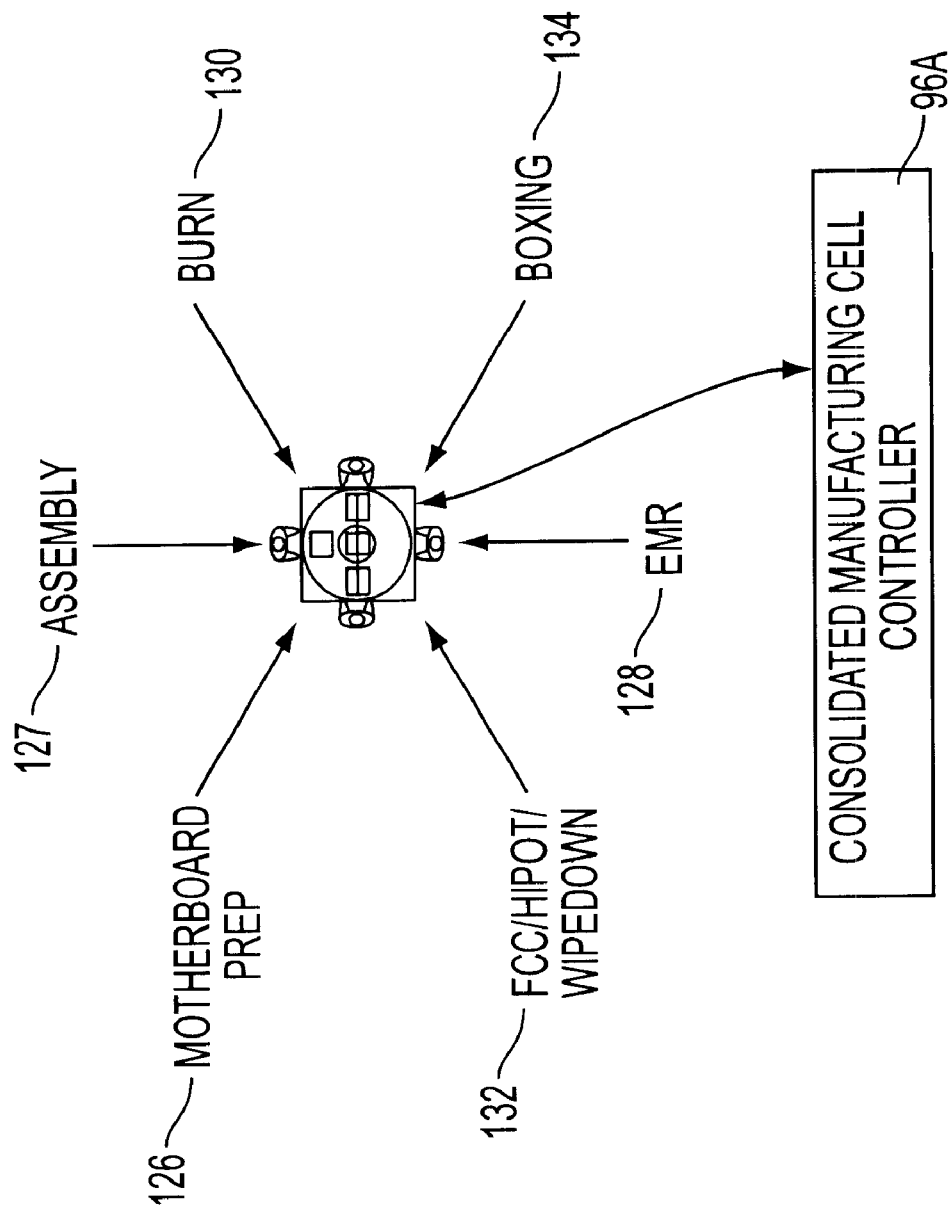
FIG. 9 is a Schematic view of the consolidated manufacturing cell in further detail.

The consolidated manufacturing assembly cell 112 is responsible for the following operations which include: chassis/mother board prep, assembly, test/burn, EMR, wipedown, and boxing and is generally denoted as the transformation area 92 in FIG. 7 (and shown in detail in FIG. 9).

The assembly cell substantially includes all of the necessary tools and test equipment to perform a transformation process. Workspace, tool placement, test equipment, and material delivery for the assembly cell are all optimized to facilitate operator ergonomics and streamline the BTO computer build process.

Substantially all assembly materials needed for a given computer system assembly, are delivered to a consolidated manufacturing cell 112, via an overhead conveyor system 107, substantially in synchronization of when they are needed in the process. After each computer system unit is assembled, each unit is automatically routed to a local burn process step area (118 of FIG. 8) of the consolidated manufacturing cell.

The burn process step area utilizes hot-pallet technology such as known in the art. The hot-pallet technology eliminates the need for repeated plug and unplug of the computer cabling for the burn process step test. A low cost intelligent material handling system is incorporated into the burn process step area. The material handling system allows for an automatic loading and unloading of computer systems on a first-in first-out (FIFO) basis. The "local" burn process step area facilitates order purity, and reduces idle work in progress (WIP), and unduly long travel times. The local burn process step area also facilitates hard drive software download, which is a benefit to the consolidated manufacturing cell design.

With the manufacturing process of the present disclosure, EMR technicians are a shared resource. EMR technicians are called by an assembly cell as needed to assist with failed computer system units that require advanced skills or special test equipment. By having failed computer system units remain primarily at the assembly cell, operators get direct feedback on any assembly errors, and can furthermore learn from any of the operator's mistakes. Portable EMR carts (not shown) are available for transporting special test equipment and replacement parts to an assembly cell.

After burn process step testing, computer systems are automatically routed back into the operator area of the assembly cell. At this time, a suitable message signal or call is placed to the kit boxing portion of kitting, for a corresponding shipping box 125 to be built and delivered to the consolidated manufacturing assembly cell 112. While a box 125 is being built and delivered, the given computer system is FCC tested, inspected, and wiped down. More particularly, passed systems get an FCC label, are inspected for cosmetic defects, and then wiped down. Substantially by the time these latter steps are completed for a given computer system, the corresponding shipping box arrives 125 via an overhead conveyor 107. An operator positions the shipping box 125 upon a table top of the assembly cell, and removes documentation contents. The operator then uses a Vacu-hoist (not shown) or other suitable lifting tool to load the finished product (i.e., computer system) into the shipping box 125. The documentation contents are then placed back into the shipping box 125. A ground conveyor system 106 transports the finished computer system in its shipping box 125 to a taping machine (not shown). The taping machine seals the shipping box 125 and thereafter the around conveyor system 106 transports the sealed shipping box to Direct Ship (94 shown in FIG. 6).

Boxing/Documentation Process

Documentation and shipping material is initially delivered to the factory through one or more dock doors located proximate the kitting area. Upon receipt, the documentation and shipping material is loaded directly into appropriate material prep equipment. Four types of material prep equipment are utilized for documentation and shipping materials. The equipment includes: flow racks (not shown), vertical carousels 100 (referring back to FIG. 7), automated dispensing systems (not shown), and box erectors 102. Flow racks can store any type of material and are best suited for high volume, odd shaped, sensitive parts. Vertical carousels 100 save floor space and are best suited for medium volume, odd shaped, sensitive parts. Automated dispensing systems reduce labor requirements and are best suited for high volume parts, that are consistent in both shape and weight, and are not sensitive to automated material handling. Box erectors 102 eliminate a manually intensive assembly operation and provide space savings.

At the start of the boxing/documentation process for a given customer order, a shipping box and a Doc-Box (not shown, but would most likely be a box of suitable size for containing documentation for a given customer order) are constructed in an automated fashion. A Packing Sling is then placed inside the shipping box, to protect the computer during shipping. The shipping box, Doc-Box, and packing sling are then routed, for example, via conveyor, to the documentation area.

At the documentation area, operators pick shipping box and documentation items and/or parts, according to the requirements of a given customer order from the flow racks/carousel and place the parts in the Doc-Box. The Doc-Box is positioned proximate the operator, on a manual slide, to facilitate part picking ergonomics. Operators work on one Doc-Box at a time, to reduce the chances for missing and wrong. In addition, parts are scanned before being placed in a corresponding box. In the case of the automated dispenser, the automated dispensing machine delivers the required materials onto a small tote or bin. When finished, an operator empties the small tote or bin contents into the Doc-Box, and returns the bin to the automated dispensing machine. At the end of the boxing/documentation line, a shipping label corresponding to a given customer order currently being filled is automatically applied to the shipping box. Then the Doc-Box is filled, it is placed inside the shipping box (125 of FIG. 8). The shipping box 125 is then delivered to its respective requesting assembly cell via an overhead conveyor system 107. With respect to the boxing/documentation area, a suitable material management software program tracks inventory levels, and notifies the appropriate vendor when replenishment supplies are required or needed.

As represented by FIG. 9, the present embodiments advantageously provide a work cell and process for physically consolidating the transformation process of a computer system including motherboard preparation 125, chassis preparation (not shown), assembly 126, EMR 128, burn 130, test 132 and boxing 134 during manufacturing of the same into one work area.

The new consolidated manufacturing assembly work cell provides a streamlined process, furniture, fixtures, automation and intelligent controls which physically consolidate the steps of the transformation process (i.e., chassis prep, mother board prep, assembly EMR, burn, test and boxing). Clearly, this consolidated work cell and process are quite different from prior manufacturing facilities in which the assembly/EMR/burn/test/box steps are carried out in physically separate areas. The consolidation provides numerous current advantages, as well as provide for future adaptability and scalability.

The consolidated assembly cell of the present disclosure also strengthens existing Continuous Flow Manufacturing. For example, the consolidated manufacturing assembly cell provides on the order of approximately four times (4x) productivity impact over the prior manufacturing line process. Throughput on the order of 1050 units per hour are believed possible for a typical line. An improvement on the order of approximately 250% gain in labor efficiency is estimated, in which a previous ratio on the order of 2.3 units/hr/employee is compared to a new ratio on the order of 5.8 units/hr/employee. Furthermore, the present embodiments provide a four times (4x) improvement in factory floor space utilization, i.e., in terms of units per hour per square foot (units/hr./sq.ft.).

The present embodiment also support a one team/one unit build process. The consolidated assembly cell includes a modular design which greatly simplifies future build-to-order factory expansion and/or reduction requirements. The consolidated assembly cell further provides for improved team communication. The manufacturing process which includes the consolidated assembly cell also facilitates order purity (i.e., customers orders are able to be built and tested and shipped collectively).

The consolidated assembly cell and manufacturing process still further provide for improved ergonomics, for instance, by the elimination of manual material handling carts. The need for a separate burn area distal from the assembly area is also eliminated. Accordingly, an improved flexibility in the build-to-order manufacturing of custom configured computer systems is accomplished. The use of overhead material delivery dramatically improves flow and clears previously obstructed or occupied floor space. In addition, the present embodiments enable fast response to manufacturing problems/quality control issues.

What is claimed is:

1. A consolidated manufacturing cell method for the manufacture of custom configured computer systems comprising:

providing a work surface including at least one section suitable for use during an assembly of a computer system from a kit of parts;

providing an elevator including a cargo surface suitable for receiving an assembled computer system and being disposed with respect to the work surface for vertical movement between at least a first vertical level and a second vertical level;

providing at least one burn slot vertically disposed with respect to the work surface, the at least one burn slot further for receiving an assembled computer system during a prescribed burn processing thereof; and controlling an operation of the elevator to deliver an assembled computer system from the work surface to an available burn slot of the at least one burn slot.

2. The method of claim 1, further including:

providing a detector for detecting a presence of an assembled computer system upon the cargo surface of the elevator, wherein controlling the operation of the elevator includes controlling the operation of the elevator in response to a detection of the assembled computer system by the detector.

3. The method of claim 1, wherein controlling the operation of the elevator includes controlling the operation of the elevator for delivery of the assembled computer system within the available burn slot in a prescribed orientation, the prescribed orientation including power and communication ports of the assembled computer system being accessible from an exterior of the consolidated manufacturing cell.

4. The method of claim 1, wherein controlling the operation of the elevator includes controlling the operation of the elevator for retrieval of a prescribed computer system from a corresponding burn slot in response to an indication that burn processing for the prescribed computer system is completed.

5. The method of claim 1, wherein controlling the operation of the elevator includes controlling the operation of the elevator for delivering the prescribed computer system to the work surface during the retrieval.

6. The method of claim 1, further including:

displaying information to at least one operator, the information relating to the manufacture of a custom configured computer system.

7. The method of claim 6, wherein displaying information includes using an interactive flat panel display for enabling interactive communications between an operator and a manufacturing cell controller.

8. The method of claim 1, further including:

monitoring an available capacity of the consolidated manufacturing cell and signaling a preparation and delivery of a kit of parts to be received at the work surface in response to a prescribed measure of available capacity.

9. The method of claim 1, further including:

providing an overhead lift system for delivering a kit of parts from an overhead conveyor to the surface area.

10. The method of claim 1, further including:

indicating a completion of burn processing of a prescribed assembled computer system; and responsive to the indication, signaling a preparation of a shipping box for the prescribed assembled computer system.

11. The method of claim 1, further including:

providing an overhead shipping box chute for receiving a prescribed shipping box therein, the overhead chute being positioned in proximity to the work surface such that the prescribed shipping box is within easy reach of an operator for placement of the prescribed shipping box onto the work surface.

12. The method of claim 11, further including:

lifting an assembled and tested computer system from the work surface area into the prescribed shipping box.

13. The method of claim 12, further including:

providing a conveyor system for routing a boxed computer system from the consolidated manufacturing cell to at least one of the following selected from the group consisting of a direct ship area and a shipping distribution center.

* * * * *